United States Patent
Saxena et al.

[19]

[11] Patent Number: 5,982,465
[45] Date of Patent: *Nov. 9, 1999

[54] FILM COMPENSATED NORMALLY WHITE SUPER-TWIST NEMATIC LIQUID CRYSTAL DISPLAY THAT REDUCES CHROMATICITY SHIFTS OVER LARGE TEMPERATURE AND VIEWING ANGLE RANGE

[75] Inventors: Ragini Saxena, Simi Valley; Bruce K. Winker; Donald B. Taber, both of Thousand Oaks, all of Calif.

[73] Assignee: Rockwell International Corporation, Costa Mesa, Calif.

[ * ] Notice: This patent is subject to a terminal disclaimer.

[21] Appl. No.: 08/893,891

[22] Filed: Jul. 11, 1997

[51] Int. Cl.$^6$ .................................................. G02F 1/1335
[52] U.S. Cl. ........................... 349/119; 349/117; 349/121
[58] Field of Search ..................... 349/119, 121, 349/117

[56] References Cited

U.S. PATENT DOCUMENTS

| | | | |
|---|---|---|---|
| 4,701,028 | 10/1987 | Clerc et al. | 349/98 |
| 5,196,953 | 3/1993 | Yeh et al. | 349/119 |
| 5,260,109 | 11/1993 | Iida et al. | 428/1 |
| 5,504,603 | 4/1996 | Winker et al. | 349/117 |
| 5,557,434 | 9/1996 | Winker et al. | 349/117 |
| 5,579,139 | 11/1996 | Abileah et al. | 349/117 |
| 5,589,963 | 12/1996 | Gunning, III et al. | 349/119 |
| 5,594,568 | 1/1997 | Abileah et al. | 349/120 |
| 5,737,048 | 4/1998 | Abileah et al. | 349/121 |

OTHER PUBLICATIONS

P.L. Egerton, E. Pitts, and A. Reiser, "Photoycycloaddition in solid Poly(vinyl cinnamate). The Photoreactive Polymer Matrix as an Ensemble of Chromophore Sites", Macromolecules, 1981, 14, *American Chemical Society*, pp. 95–100.

Miroslav V. Mijovic et al., Cross–Link in a Solid Photopolymer Based on the Chromophore 1,2–Diphenylcyclopropene, Macromolecules 1982, 15, *American Chemical Society*, 1982, pp. 1464–1471.

H. Angus Macleod, Optical Sciences Center, University of Arizona, Tucson, Arizona "Structure–related optical properties in thin films," *J. Vac. Sci. Technol.*, A 4 (3), May/Jun. 1986, pp. 418–422.

Federic J. Kahn, "The molecular physics of liquid–crystal devices," *Physics Today*, May 1992, pp. 68–74.

Tomosyoshi Motohiro and Y. Taga, "thin film retardation plate by oblique deposition," *Applied Optics*, vol. 28, No. 13, Jul. 1, 1989, pp. 2466–2482.

D.A. Yakolev et al., New concept to achieve color LCDs with Linearly Photopolymerized (LLP) LCD–substrates.

M. Akram Sandhu, Dennis J. Savage, and Thomas W. Martin, "Photoreactive Polyesters with Unusual Thermal Properties: Synthesis, Structure–Property Relationships, and Applications," *Photographic Science and Engineering*, vol. 23, No. 3, May/Jun. 1979, pp. 159–164.

Tsuyoshi Yamamoto et al., "Full–Cone Wide Viewing–Angle Multicolor CSH–LCD," *SID 91 Digest*, pp. 761–765.

C.H. Gooch and H.A. Tarry, "The optical properties of twisted nematic liquid crystal structures with twist angles $\leq 90°$," *J. Phys, D: Appl. Phys.*, vol. 8, 1975, pp. 1575–1584.

*Primary Examiner*—William L. Sikes
*Assistant Examiner*—Heidi L. Eisenhut
*Attorney, Agent, or Firm*—James P. O'Shaughnessey; John J. Deinken

[57] ABSTRACT

A normally white super-twist nematic liquid crystal display is disclosed. Between a polarizer layer and an analyzer layer, the display includes a super-twist nematic liquid crystal cell having first and second substrates and a liquid crystal layer disposed between the first and second substrates. The display further includes at least one positively birefringent A-plate compensator layer disposed between the polarizer layer and the super-twist nematic liquid crystal cell and at least one positively birefringent A-plate compensator layer disposed between the analyzer layer and the super-twist nematic liquid crystal cell to reduce chromaticity shifts of the display at wide viewing angles and over temperature variations.

9 Claims, 5 Drawing Sheets

POLARIZER 205
ABSORPTION AXIS @ $\phi \approx 130°$

A-PLATE 250
$\phi \approx 100°$
$\Delta nd \approx 90$ to $150\,nm$

LIQUID CRYSTAL LAYER 220
$\Delta nd \approx 640$ TO $900\,nm$
$\phi \approx 30°$ A-PLATE 255
$\phi \approx 75°$
$\Delta nd \approx 90$ TO $150\,nm$ ANALYZER 210
ABSORPTION AXIS @ $\phi \approx 50°$

FILM COMPENSATED NORMALLY WHITE SUPER-TWIST NEMATIC LIQUID CRYSTAL DISPLAY THAT REDUCES CHROMATICITY SHIFTS OVER LARGE TEMPERATURE AND VIEWING ANGLE RANGE

INCORPORATED BY REFERENCE

The following published documents are herein incorporated by reference: (1) Iieda et al., U.S. Pat. No. 5,260,109 entitled "Method for Polarizing Light;" and (2) Kahn, The Molecular Physics of Liquid-Crystal Devices, *Physics Today*, p. 68 (May 1982); and (3) Winker et al., U.S. Pat. No. 5,557,434 entitled "Optical Compensator Including An O-Plate For Super-Twist Nematic Liquid Crystal Display."

In addition, the following co-pending and commonly assigned U.S. Patent Application is herein incorporated by reference: U.S. patent application Ser. No. 08/313,531 filed Sep. 30, 1994 and entitled "Organic Polymer O-Plate Compensator For Improved Gray Scale Performance in Twisted Nematic Liquid Crystal Displays" by Bruce K. Winker et al.

BACKGROUND OF THE INVENTION

The invention relates to an improved passive matrix super-twist nematic (STN) liquid crystal display (LCD), and more particularly, to a compensated normally white (NW) STN LCD.

Active matrix LCDs (AMLCDs) exhibit high contrast and stable chromaticity over a wide range of viewing angles, but frequently cost more than the market for mobile displays can bear. Mobile LCD markets such as the commercial aircraft and the automobile markets necessitate lower cost displays. Passively addressed (i.e., using multiplexed addressing techniques) STN LCDs cost less than AMLCDs, and therefore are an attractive alternative in certain LCD markets. STN LCDs are well-known in the art. See for example, Scheffer and Nehrin, *Liquid Crystals Applications and Uses*, B. Bahadhur, ed., 1990, p 231.

Normally black (NB) STN LCDs (commonly referred to as "film-compensated STN" or "FSTN" displays) and uncompensated NW STN LCDs (commonly referred to as optical mode interference or OMI displays) are examples of comparatively low-cost displays that can be driven by passive addressing techniques. Compared to NW STN LCDs, FSTN LCDs have more limited operational temperature ranges and exhibit large chromaticity shifts over the field-of-view (FOV). While NW STN LCDs are known to possess a wider operational temperature range than FSTN LCDs, they suffer from low display brightness and large chromaticity shifts over the range of viewing angles and of operating temperatures. These disadvantages of prior art NW STN LCDs limit their use in applications such as the commercial aircraft and automobile markets, to name just a few. Therefore, there is a need for a NW STN LCD which overcomes these limitations of prior art NW STN LCDs.

SUMMARY OF THE INVENTION

A normally white super-twist nematic liquid crystal display is disclosed. Between a polarizer layer and an analyzer layer, the display includes a super-twist nematic liquid crystal cell having first and second substrates and a liquid crystal layer disposed between the first and second substrates. The display further includes at least one positively birefringent A-plate compensator layer disposed between the polarizer layer and the liquid crystal cell and at least one positively birefringent A-plate compensator layer disposed between the analyzer layer and the liquid crystal cell to reduce chromaticity shifts of the display at wide viewing angles and over temperature variations.

DETAILED DESCRIPTION OF THE PREFERRED EMBODIMENTS

In a NW STN LCD configuration, the STN liquid crystal cell is placed between two polarizing layers (one referred to as the polarizer and the other as the analyzer) which have absorbing axes configured or oriented relative to one another to produce a NW display. The "non-select" areas appear light in a NW STN LCD because light passing through the display is transmitted by the analyzer. The "select" areas appear dark because, in this energized state, the STN liquid crystal layer changes the angular orientation of the light passing through the display such that it is extinguished by the analyzer.

When viewed directly a NW STN LCD provides a high quality output, but at large viewing angles, the image tends to degrade and large chromaticity shifts are exhibited. This occurs because the phase retardation effect of the liquid crystal material on light passing through it inherently varies with the inclination angle of the light, leading to a lower quality image at large viewing angles. Further, large chromaticity shifts are exhibited by NW STN LCDs over the operational temperature range. However, by introducing one or more optical compensating elements in conjunction with the liquid crystal cell it is possible to substantially correct for the undesirable angular and temperature effects and to thereby provide a greatly improved image at larger viewing angles and over larger temperature ranges than otherwise possible.

Figure 1:
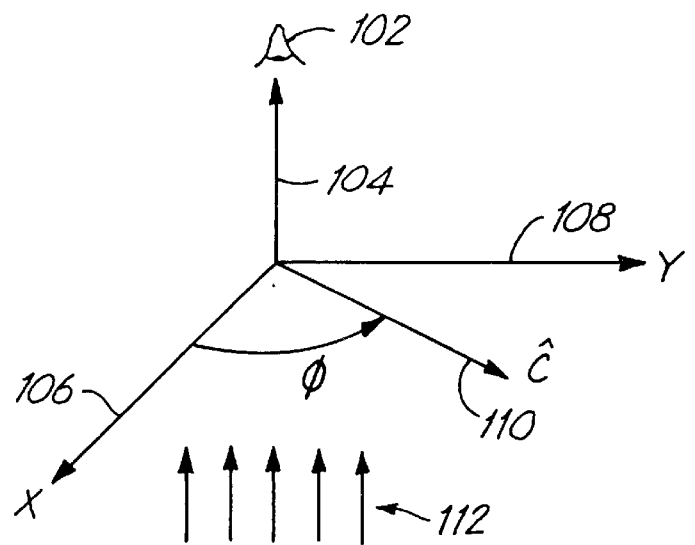
FIG. 1 depicts the coordinate system that is used to specify component orientations in the description of the present invention.

FIG. 1 depicts the coordinate system which is used to describe the orientation of both the liquid crystal and birefringent compensator optic axes. Light propagates toward viewer 102 in positive z direction 104 which, together with x-axis 106 and y-axis 108, form a right-handed coordinate system. Backlighting is provided, as indicated by arrows 112, from the negative z direction. The azimuthal or twist angle $\phi$ is defined as the angle between the x-axis and the principal symmetry or molecular optic axis ĉ (denoted by reference number 110), which lies in the x-y plane.

Figure 2:
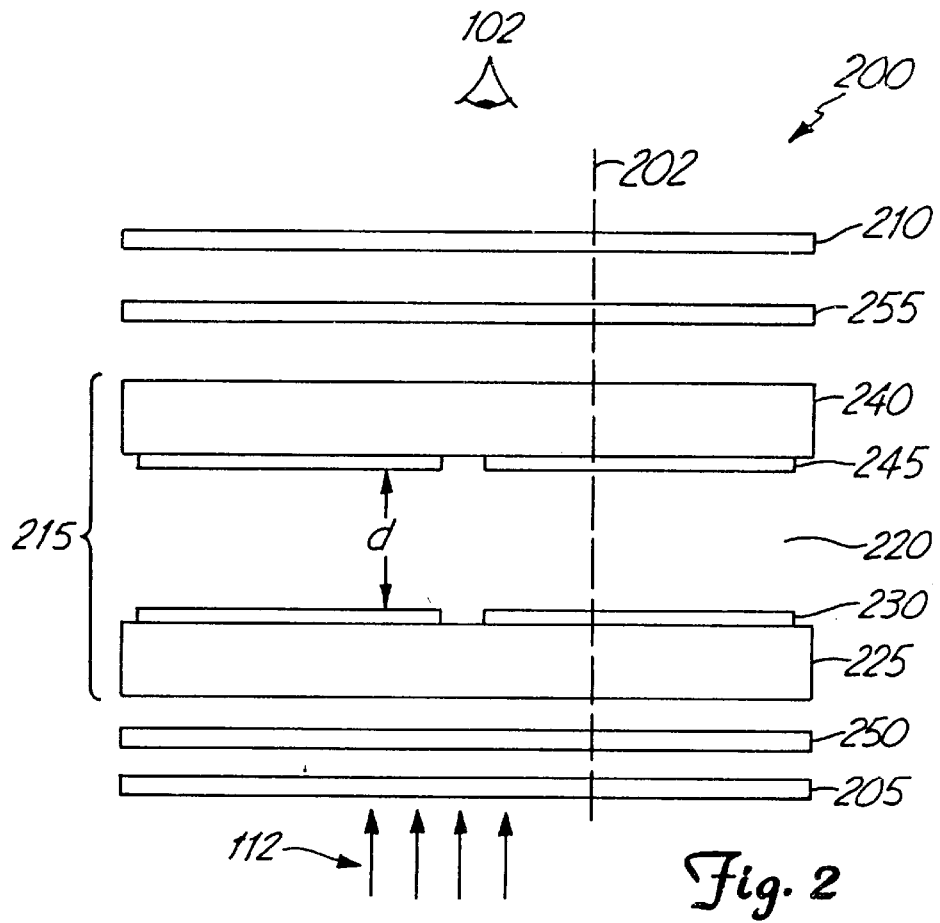
FIG. 2 is a diagrammatic illustration of a NW STN LCD in accordance with the present invention which utilizes positively birefringent A-plate compensator layers to improve the performance of the display.
Figure 3:
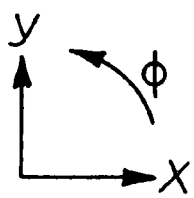
FIG. 3 is a diagrammatic expanded view of the compensated NW STN LCD illustrated in FIG. 2 which further illustrates the compensator configuration of the present invention.
Figure 3:
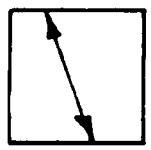
Figure 3:
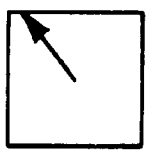
Figure 3:
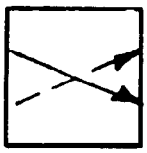
Figure 3:
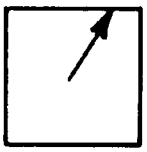
Figure 3:
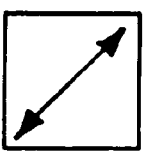

FIGS. 2 and 3 illustrate a region of NW STN LCD 200 which is compensated in accordance with preferred embodiments of the present invention. It must be noted that while display 200 is an exemplary embodiment of the present invention, the present invention is not limited to the specific embodiment illustrated in FIG. 2. Display 200 includes polarizer layer 205 and analyzer layer 210, with their respective absorption axes having azimuthal angular orientations $\phi$, which together form a NW display configuration. Polarizer layer 205 and an analyzer layer 210 are both optical components of the type well known in the art which polarize electromagnetic fields. Typically, the term "polarizer" refers to a polarizer element that is positioned closest to source of light 112, while the term "analyzer" refers to a polarizer element that is positioned closest to viewer 102 of the NW STN LCD.

It is convenient in describing the compensation elements of the invention to refer to a normal axis perpendicular to the display, which is depicted by dashed line 202. Dashed line 202 corresponds to the z-axis in the coordinate system of FIG. 1. As such, the compensation elements or layers of display 200 lie in planes corresponding to and parallel to the x-y plane shown in FIG. 1. Further, backlighting 112 is provided in a direction from the polarizer side of the display. Viewers of display 200 view the display from the analyzer side at various angles relative to normal axis 202.

Between polarizer 205 and analyzer 210, display 200 includes liquid crystal cell 215, first positively birefringent A-plate compensator layer 250 and second positively birefringent A-plate compensator layer 255. Liquid crystal cell 215 includes STN liquid crystal layer 220, first liquid crystal cell substrate 225 having on its surface a plurality of first transparent electrodes 230, and second liquid crystal cell substrate 240 having on its surface a plurality of second transparent electrodes 245. The area between and including substrates 225 and 240 is commonly referred to as the liquid crystal cell, while the physical thickness of liquid crystal layer 220 is commonly referred to as the cell gap (d). As is well known in the LCD art, electrodes 230 and 245 are used to selectively alter the transmission of sections of the LCD to display images and/or information thereon. First positively birefringent A-plate compensator layer 250 is preferably positioned between polarizer layer 205 and substrate 225 (i.e., between the polarizer and the liquid crystal cell), and second positively birefringent A-plate compensator layer 255 is preferably positioned between analyzer layer 210 and substrate 240 (i.e., between the analyzer and the liquid crystal cell).

Those of ordinary skill will recognize that the interior surfaces of the STN liquid crystal cell's substrates 225 and 240 include conventional layers (not shown) at the interfaces between the substrates and liquid crystal material 220. An alignment layer orients liquid crystal material 220 at each interface along a specific azimuthal direction, and with a small pre-tilt angle. Useful surface pre-tilt angles range from about 1° to about 30°. Liquid crystal layer 220 is composed of a liquid crystal material that has a positive dielectric anisotropy. The liquid crystal material sold by the Merck company under designation Merck ZLI-4431 has been found to be satisfactory in preliminary modeling tests. Many other STN liquid crystal materials are available commercially and can also be used. Further, in some preferred embodiments, the liquid crystal material includes a conventional chiral dopant of any convenient type in sufficient concentration to produce a left-handed twist, a pitch, p, and a conventional cell-gap-to-pitch ratio, d/p, of −0.55.

In preferred embodiments, the Merck liquid crystal material has a total twist of about 240° and a surface pre-tilt angle of about 6°. Useful twist angles are substantially greater than about 180° and less than about 270°, preferably ranging from about 220° to about 250°. The azimuthal orientation $\phi$ of the liquid crystal material at first substrate 225 is preferably between about 20° and 40°, for example 30°. This orientation is selected to produce an azimuthal orientation $\phi$ of the liquid crystal director in the middle of the liquid crystal cell of 270°. A different orientation of the liquid crystal material at substrate 225 would be used for a different twist angle in another implementation. In some preferred embodiments, liquid crystal layer 220 has thickness d chosen to produce phase retardation $\Delta$nd for the liquid crystal cell of between 640 nm and 900 nm. Preferably, the ratio of the phase retardation of the liquid crystal layer to that of both A-plates is between about 6.0 and 7.5.

Polarizer layer 205 has azimuthal orientation angle $\phi$ of its absorption axis of between about 110° and 140°, for example 130°. Analyzer layer 210 has azimuthal orientation angle $\phi$ of its absorption axis of between about 40° and 60°, for example 50°. The orientations of polarizer layer 205, analyzer layer 210, and liquid crystal cell 215 are selected to produce a NW STN LCD.

An A-plate is a birefringent layer with its extraordinary axis (i.e., its ĉ-axis) oriented parallel to the surface of the layer. Its A-axis is thus oriented normal to the surface (parallel to the direction of normally incident light and thus to normal axis 202), leading to its designation as an A-plate. A-plates may be fabricated by the use of uniaxially stretched polymer films, such as polyvinyl alcohol, or other suitably oriented organic birefringent materials. Furthermore, a negatively birefringent A-plate may be substituted for a positive A-plate. In this case, the negatively birefringent A-plate would be oriented with its extraordinary axis perpendicular to the orientation appropriate for a positively birefringent A-plate. Additional changes would also be required in the other components of the compensator to optimize performance when a negative A-plate is used.

For A-plate compensator layers 250 and 255, the polymer films each preferably have phase retardation values $\Delta$nd of between about 90 nm and about 150 nm. The retardation thicknesses or values of A-plate compensator layers 250 and 255 depends upon the phase retardation thickness or value of the liquid crystal layer. Thicker liquid crystal layers require more compensation, and thus make it preferable to use higher phase retardation thicknesses of the A-plate compensation layers. Further, A-plate compensator layer 250 preferably has azimuthal orientation angle $\phi$ of its extraordinary axis (i.e., its ĉ-axis or optic axis) of between about 90° and 110°, for example 100°. A-plate compensator layer 255 preferably has azimuthal orientation angle φ of its extraordinary axis of between about 70° and 85°, for example 75°.

Figure 4A:
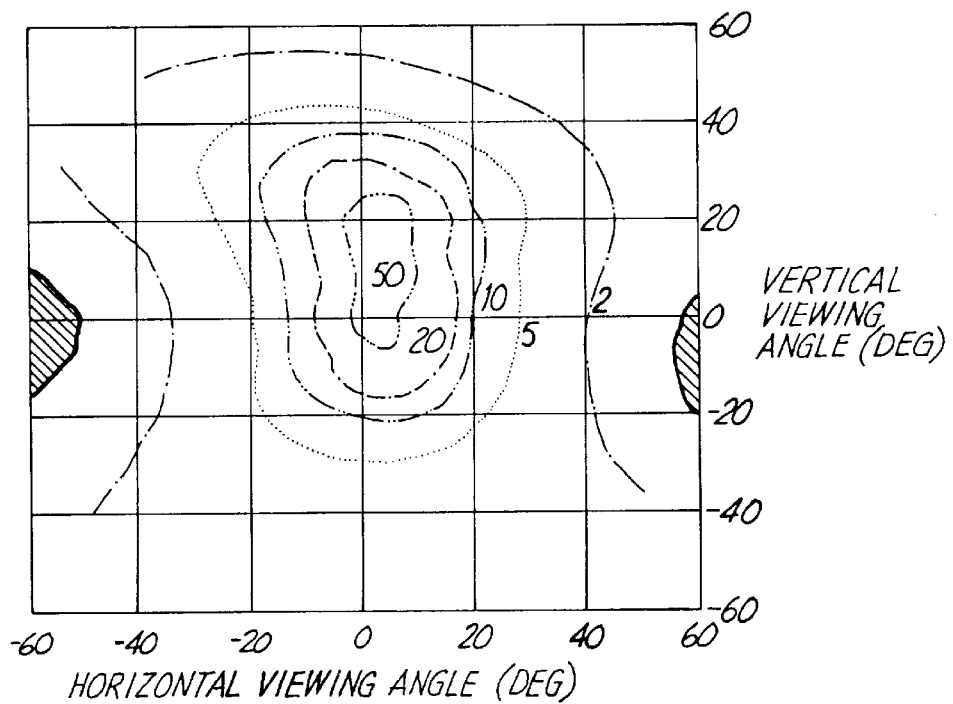
FIG. 4A is a plot, as a function of vertical and horizontal viewing angle, depicting calculated isocontrast contours for a prior art uncompensated NW STN LCD.
Figure 4B:
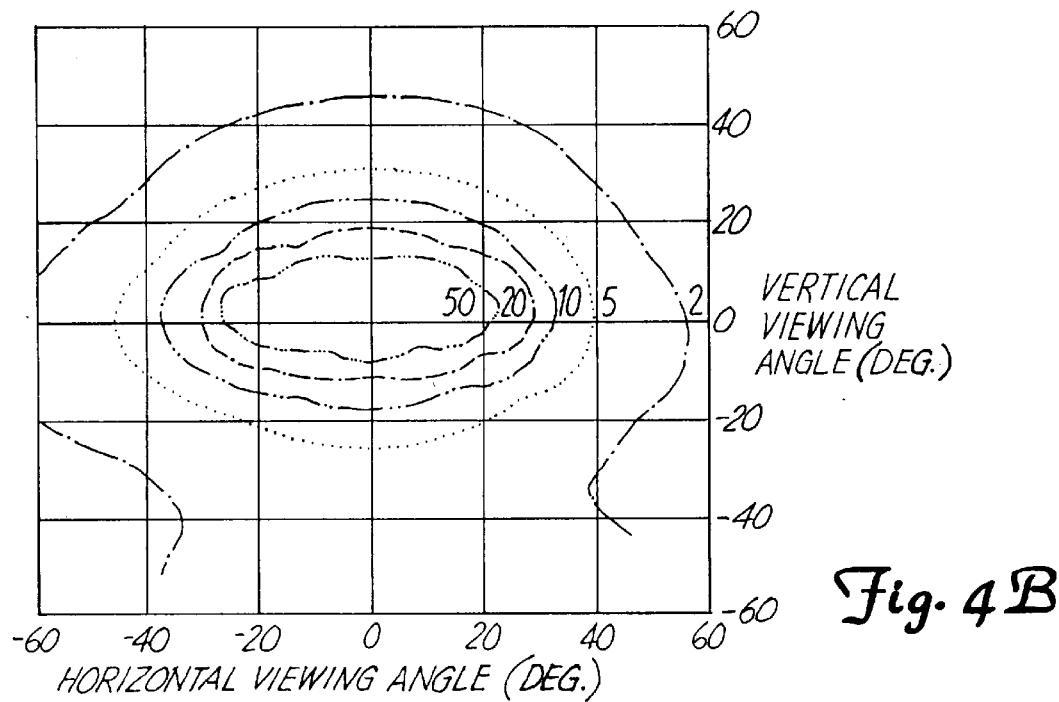
FIG. 4B is a plot, as a function of vertical and horizontal viewing angle, depicting calculated isocontrast contours for a NW STN LCD compensated in accordance with the present invention.

FIGS. 4A and 4B are plots, as a function of vertical and horizontal viewing angle, depicting calculated isocontrast contours for a prior art uncompensated NW STN LCD and for the NW STN LCD of the present invention illustrated in FIGS. 2 and 3. As is clear from a comparison of FIGS. 4A and 4B the compensation configuration of the present invention significantly increases the maximum horizontal viewing angles from which the NW STN LCD can be viewed to obtain the highest contrast ratio. In the prior art (FIG. 4A), the highest contrast ratio was realized only when the display was viewed from horizontal viewing angles between about −5° and about +10°. In comparison, the present invention provides the highest contrast ratio when viewed from horizontal viewing angles between about −30° and about +25°. Although a slight reduction in the vertical viewing angle range is exhibited, benefits of the present invention are clear from the results illustrated in FIGS. 4A and 4B.

Figure 5A:
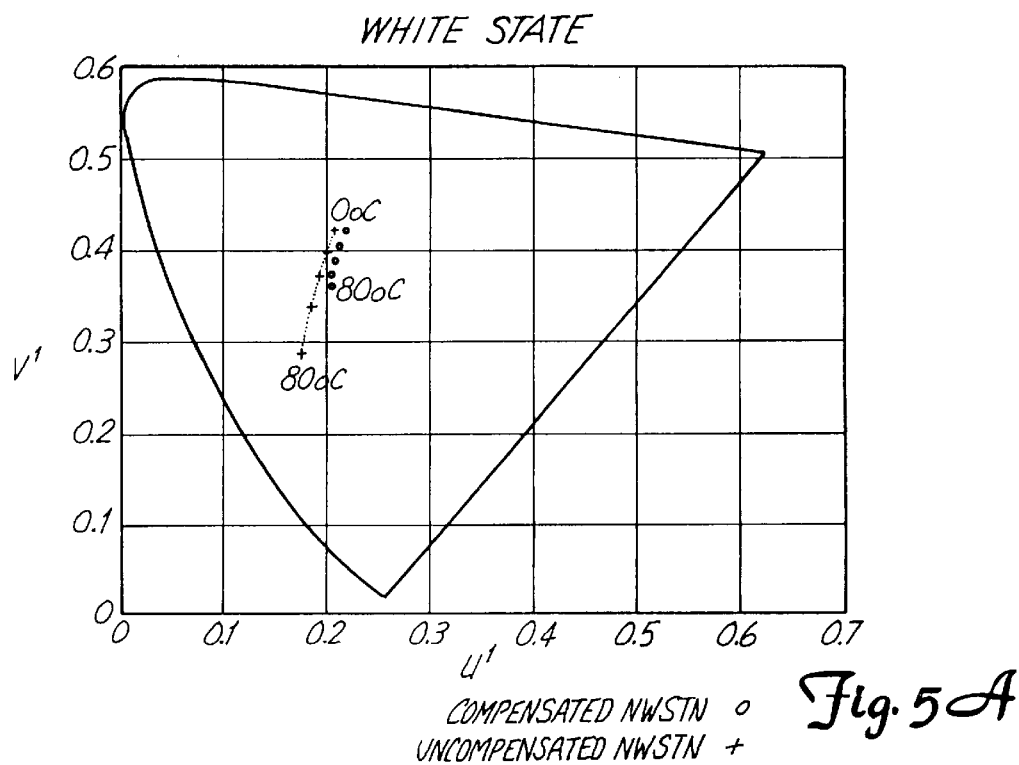
FIG. 5A is a plot illustrating modeled chromaticity of the white state, over temperatures ranging from 0° C. to +80° C., for both a prior art uncompensated NW STN LCD and for a NW STN LCD compensated in accordance with the present invention.
Figure 5B:
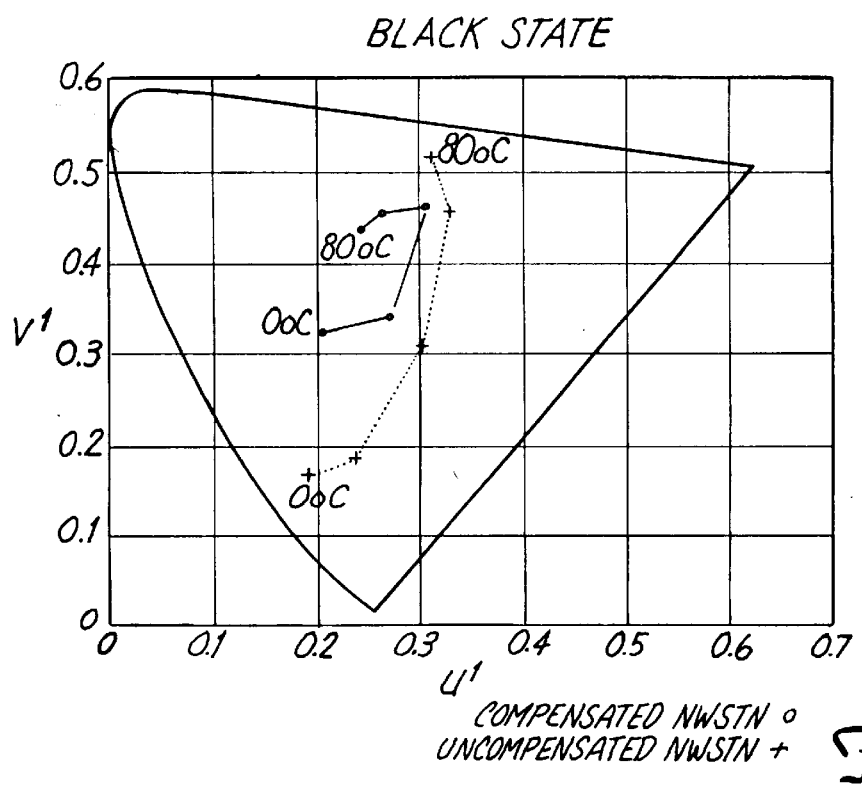
FIG. 5B is a plot illustrating modeled chromaticity of the black state, over temperatures ranging from 0° C. to +80° C., for both a prior art uncompensated NW STN LCD and for a NW STN LCD compensated in accordance with the present invention.

FIG. 5A is a plot illustrating modeled chromaticity of the white (non-select) state, over temperatures ranging from 0° C. to +80° C., for both a prior art uncompensated NW STN LCD and a NW STN LCD compensated in accordance with the present invention using the configuration illustrated in FIGS. 2 and 3. As is clearly illustrated in FIG. 5A, the present invention provides significantly reduced chromaticity shifts of the white state as a function of temperature as compared to the prior art uncompensated NW STN LCD. FIG. 5B is a plot illustrating modeled chromaticity of the black (select) state, over temperatures ranging from 0° C. to +80° C., for both the prior art uncompensated NW STN LCD and for the NW STN LCD compensated in accordance with the present invention. FIG. 5B illustrates the same type of improvement for the black state as was realized by the present invention for the white state. As temperatures increase, there is significantly less variation of the chromaticity in the black state when using the compensation configuration of the present invention, as compared to the prior art.

Figure 6A:
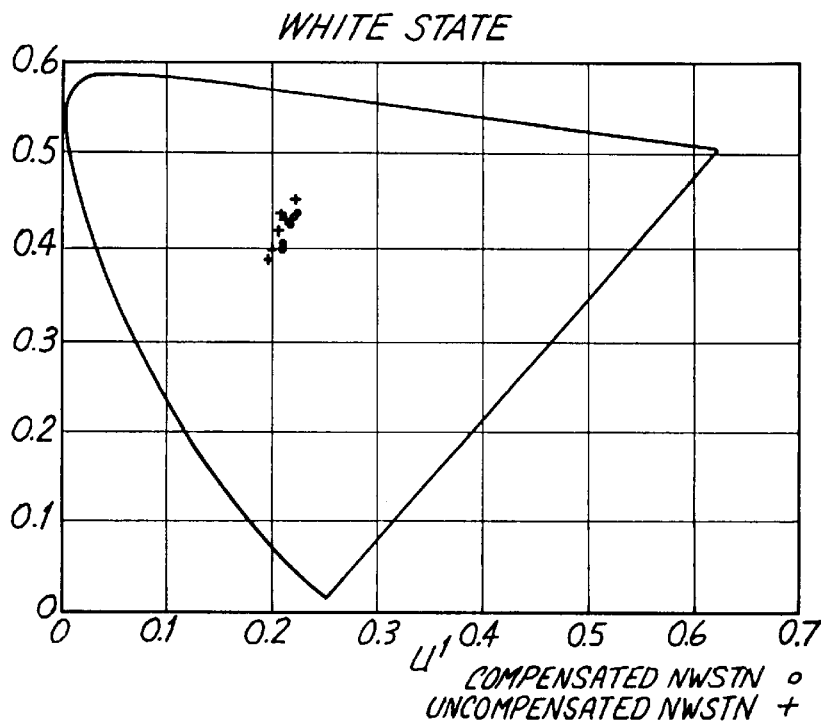
FIG. 6A is a plot illustrating modeled chromaticity of the white state, over horizontal viewing angles ranging from −40° to +40° and over vertical viewing angles ranging from −20° and +30° for both a prior art uncompensated NW STN LCD and for a NW STN LCD compensated in accordance with the present invention.
Figure 6B:
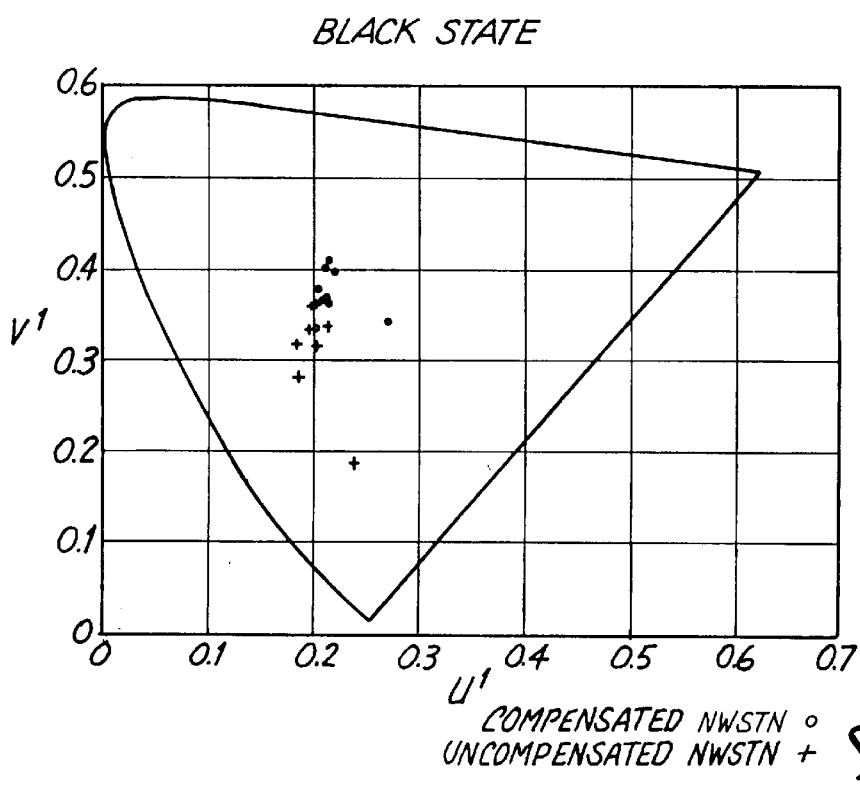
FIG. 6B is a plot illustrating modeled chromaticity of the black state, over horizontal viewing angles ranging from −40° to +40° and over vertical viewing angles ranging from −20° and +30°, for both a prior art uncompensated NW STN LCD and for a NW STN LCD compensated in accordance with the present invention.

FIG. 6A is a plot illustrating modeled chromaticity of the white state, over horizontal viewing angles ranging from −40° to +40° and over vertical viewing angles ranging from −20° to +30°, for both the prior art uncompensated NW STN LCD and for the NW STN LCD compensated in accordance with the present invention using the configuration illustrated in FIGS. 2 and 3. FIG. 6B is a plot illustrating modeled chromaticity of the black state, over horizontal viewing angles ranging from −40° to +40° and over vertical viewing angles ranging from −20° and +30° for both the prior art uncompensated NW STN LCD and for the NW STN LCD compensated in accordance with the present invention. FIG. 6A illustrates a slight improvement in the white state chromaticity stability of the NW STN LCD of the present invention, as compared to the prior art. However, FIG. 6B illustrates a large improvement in the black state chromaticity stability of the present invention over the prior art uncompensated NW STN LCD.

Although the present invention has been described with reference to preferred embodiments, workers skilled in the art will recognize that changes may be made in form and detail without departing from the spirit and scope of the invention. For example, the preferred orientations and phase retardation values of the present invention were selected using computerized optimization techniques. However, the exact orientations used can vary considerably from one implementation to another. Preferred embodiments of the instant invention are illustrated and described as they might be implemented using known OMI and STN LCD technology. In the interest of clarity, not all commonly known features of an actual implementation are described in this specification.

It is also recognized that modifications and additional embodiments will undoubtedly be apparent to those skilled in the art. For example, another possible embodiment would utilize the compensator layers as one or more of the substrates in the display structure. The instant invention is applicable as well to color displays, in which color filters are associated with the arrays of electrodes in the display. In addition, conventional details of a liquid crystal display, such as electrodes, color filters, planarization layers and the like are not presented because such details are well known in the art of liquid crystal displays. Consequently, the exemplary embodiments should be considered illustrative, rather than inclusive, while the appended claims are more indicative of the full scope of the invention.

What is claimed is:

1. A normally white super-twist nematic liquid crystal display for viewing at various angles with respect to a normal axis perpendicular to the display, comprising:
   a super-twist nematic liquid crystal cell comprising:
      a first substrate positioned at a first side of the super-twist nematic liquid crystal cell;
      a second substrate positioned at a second side of the super-twist nematic liquid crystal cell; and
      a liquid crystal layer disposed between the first and second substrates, the liquid crystal layer including a plurality of cholesteric liquid crystal molecules, wherein the molecules have an azimuthal twist angle between the first and second substrates of substantially greater than about 180°, wherein the liquid crystal cell has a phase retardation value of between about 640 nm and about 900 nm;
   a polarizer layer disposed on the first side of the super-twist nematic liquid crystal cell;
   an analyzer layer disposed on the second side of the super-twist nematic liquid crystal cell;
   a first A-plate compensator layer disposed between the polarizer layer and the first side of the super-twist nematic liquid crystal cell; and
   a second A-plate compensator layer disposed between the analyzer layer and the second side of the super-twist nematic liquid crystal cell.

2. The normally white super-twist nematic liquid crystal display of claim 1, wherein the first and second A-plate compensators have a positive birefringence.

3. The normally white super-twist nematic liquid crystal display of claim 2, wherein the liquid crystal layer of the liquid crystal cell has an azimuthal angle orientation at the first substrate of between about 20° and 40°.

4. The normally white super-twist nematic liquid crystal display of claim 3, wherein each of the first and second A-plate compensator layers has a phase retardation value of between about 90 nm and about 150 nm.

5. The normally white super-twist nematic liquid crystal display of claim 3, wherein the ratio of the phase retardation of the liquid crystal layer to that of both of the A-plates is between 6.0 and 7.5.

6. The normally white super-twist nematic liquid crystal display of claim 5, wherein the first A-plate compensator layer has an optic axis oriented at an azimuthal angle of between approximately 90° and 110°, and wherein the second A-plate compensator layer has an optic axis oriented at an azimuthal angle of between approximately 70° and 85°.

7. The normally white super-twist nematic liquid crystal display of claim 5, wherein an absorption axis of the polarizer layer is oriented at an azimuthal angle of between approximately 110° and 140°, and wherein an absorption axis of the analyzer layer is oriented at an azimuthal angle of between approximately 40° and 60°.

8. A compensated normally white super-twist nematic liquid crystal display for viewing at various angles with respect to a normal axis perpendicular to the display, comprising:
- a super-twist nematic liquid crystal cell comprising:
  - a first substrate positioned at a first side of the super-twist nematic liquid crystal cell;
  - a second substrate positioned at a second side of the super-twist nematic liquid crystal cell; and
  - a liquid crystal layer disposed between the first and second substrates, the liquid crystal layer including a plurality of cholesteric liquid crystal molecules, wherein the molecules have an azimuthal twist angle between the first and second substrates of substantially greater than about 180°, wherein the liquid crystal material of the liquid crystal cell has an azimuthal angle orientation at the first substrate of about 30°, and wherein the liquid crystal cell has a phase retardation value of between about 640 nm and about 900 nm;
- a polarizer layer disposed on the first side of the super-twist nematic liquid crystal cell and having an absorption axis, wherein the absorption axis of the polarizer layer is oriented at an azimuthal angle of between approximately 110° and 140°;
- an analyzer layer disposed on the second side of the super-twist nematic liquid crystal cell and having an absorption axis, and wherein the absorption axis of the analyzer layer is oriented at an azimuthal angle of between approximately 40° and 60°;
- a first positively birefringent A-plate compensator layer disposed between the polarizer layer and the first side of the super-twist nematic liquid crystal cell, wherein the first positively birefringent A-plate compensator layer has a phase retardation value of between about 90 nm and about 150 nm, and wherein the first positively birefringent A-plate compensator layer has an optic axis oriented at an azimuthal angle of between approximately 90° and 110°; and
- a second positively birefringent A-plate compensator layer disposed between the analyzer layer and the second side of the super-twist nematic liquid crystal cell, wherein the second positively birefringent A-plate compensator layer has a phase retardation value of between about 90 nm and about 150 nm, and wherein the second A-plate compensator layer has an optic axis oriented at an azimuthal angle of between approximately 70° and 85°.

9. A compensated normally white super-twist nematic liquid crystal display for viewing at various angles with respect to a normal axis perpendicular to the display, comprising:
- a super-twist nematic liquid crystal cell comprising;
  - a first substrate positioned at a first side of the super-twist nematic liquid crystal cell;
  - a second substrate positioned at a second side of the super-twist nematic liquid crystal cell; and
- a liquid crystal layer disposed between the first and second substrates, the liquid crystal layer including a plurality of cholesteric liquid crystal molecules, wherein the molecules have an azimuthal twist angle between the first and second substrates of substantially greater than about 180°, wherein the liquid crystal material of the liquid crystal cell has an azimuthal angle orientation at the first substrate of about 30°, and wherein the liquid crystal cell has a phase retardation value of between about 640 nm and about 900 nm;
- a polarizer layer disposed on the first side of the super-twist nematic liquid crystal cell and having an absorption axis, wherein the absorption axis of the polarizer layer is oriented at an azimuthal angle of between approximately 110° and 140°;
- an analyzer layer disposed on the second side of the super-twist nematic liquid crystal cell and having an absorption axis, and wherein the absorption axis of the analyzer layer is oriented at an azimuthal angle of between approximately 40° and 60°;
- a first positively birefringent A-plate compensator layer disposed between the polarizer layer and the first side of the super-twist nematic liquid crystal cell, wherein the first positively birefringent A-plate compensator layer has a phase retardation value of between about 90 nm and about 150 nm, and wherein the first positively birefringent A-plate compensator layer has an optic axis oriented at an azimuthal angle of between approximately 90° and 110°; and
- a second positively birefringent A-plate compensator layer disposed between the analyzer layer and the second side of the super-twist nematic liquid crystal cell, wherein the second positively birefringent A-plate compensator layer has a phase retardation value of between about 90 nm and about 150 nm, wherein the second A-plate compensator layer has an optic axis oriented at an azimuthal angle of between approximately 70° and 85°, and wherein a ratio of the phase retardation value of the liquid crystal layer to the phase retardation values of both of the first and second positively birefringent A-plate compensator layers is between 6.0 and 7.5.

* * * * *